United States Patent
Guo et al.

(10) Patent No.: US 11,353,056 B2
(45) Date of Patent: Jun. 7, 2022

(54) HINGE HAVING AT LEAST TWO PARALLEL GEARS

(71) Applicants: Inventec (Pudong) Technology Corporation, Shanghai (CN); INVENTEC CORPORATION, Taipei (TW)

(72) Inventors: Chang-Sing Guo, Taipei (TW); En-Kuan Lin, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/852,538

(22) Filed: Apr. 19, 2020

(65) Prior Publication Data

US 2021/0277934 A1  Sep. 9, 2021

(30) Foreign Application Priority Data

Mar. 3, 2020 (CN) .......................... 202010139895.2

(51) Int. Cl.
| | |
|---|---|
| *E05D 3/12* | (2006.01) |
| *F16C 11/10* | (2006.01) |
| *E05D 11/00* | (2006.01) |
| *G06F 1/16* | (2006.01) |

(52) U.S. Cl.
CPC .............. *F16C 11/10* (2013.01); *E05D 3/122* (2013.01); *E05D 11/0054* (2013.01); *G06F 1/1681* (2013.01); *E05Y 2201/10* (2013.01); *E05Y 2201/22* (2013.01); *E05Y 2900/606* (2013.01); *G06F 1/1616* (2013.01)

(58) Field of Classification Search
CPC ....... E05Y 2201/71; E05D 3/12; E05D 3/122; G06F 1/1981; G06F 1/1681
See application file for complete search history.

(56) References Cited

U.S. PATENT DOCUMENTS

| | | | | |
|---|---|---|---|---|
| 442,689 | A * | 12/1890 | Porter | ....................... E05D 3/12 16/350 |
| 1,672,418 | A * | 6/1928 | Lehman | .................... E05D 3/12 16/243 |
| 8,720,011 | B1 * | 5/2014 | Hsu | ........................ G06F 1/1681 16/368 |

(Continued)

FOREIGN PATENT DOCUMENTS

| | | | | |
|---|---|---|---|---|
| CN | 203948431 | U | * 11/2014 | ........... G06F 1/1681 |
| CN | 112833087 | A | *  5/2021 | ............... F16C 11/04 |

*Primary Examiner* — Emily M Morgan
(74) *Attorney, Agent, or Firm* — CKC & Partners Co., LLC

(57) ABSTRACT

A shaft structure includes a carrier, a first mandrel, and a second mandrel. The carrier has a groove, a receiving space communicated with the groove, and two protruding portions. The two protruding portions protrude from an inner wall of the carrier, and the two protruding portions are located between the receiving space and the groove. The first mandrel has a first gear, a first rotation shaft, and a first connection shaft connected to the first gear and the first rotation shaft. The first gear is located in the receiving space. The second mandrel has a second gear, a second rotation shaft, and a second connection shaft connected to the second gear and the second rotation shaft. The second gear is configured to move in the receiving space and the groove.

7 Claims, 6 Drawing Sheets

(56) References Cited

U.S. PATENT DOCUMENTS

| | | | |
|---|---|---|---|
| 9,677,308 B1* | 6/2017 | Chen | G06F 1/1681 |
| 11,042,198 B2* | 6/2021 | Jan | G06F 1/1681 |
| 2006/0113457 A1* | 6/2006 | Zhang | G03G 21/1666 |
| | | | 248/637 |
| 2008/0109995 A1* | 5/2008 | Kuwajima | H04M 1/022 |
| | | | 16/354 |
| 2013/0016492 A1* | 1/2013 | Wang | G06F 1/1681 |
| | | | 361/820 |
| 2014/0251041 A1* | 9/2014 | Hsu | G06F 1/1681 |
| | | | 74/63 |
| 2014/0290009 A1* | 10/2014 | Kasai | E05D 3/12 |
| | | | 16/386 |
| 2015/0245510 A1* | 8/2015 | Hsu | G06F 1/1618 |
| | | | 16/250 |
| 2016/0011632 A1* | 1/2016 | Hsu | H04M 1/022 |
| | | | 16/354 |
| 2017/0235337 A1* | 8/2017 | Vic | E05D 11/00 |
| | | | 361/679.55 |
| 2017/0351303 A1* | 12/2017 | Kuramochi | E05D 11/082 |
| 2018/0032110 A1* | 2/2018 | Hsu | G06F 1/1616 |
| 2019/0364682 A1* | 11/2019 | Kikuchi | G06F 1/1618 |
| 2020/0291702 A1* | 9/2020 | Hsu | E05D 3/122 |
| 2021/0096607 A1* | 4/2021 | Hallar | E05D 11/1028 |
| 2021/0096608 A1* | 4/2021 | Hallar | G06F 1/1616 |

* cited by examiner

HINGE HAVING AT LEAST TWO PARALLEL GEARS

CROSS-REFERENCE TO RELATED APPLICATION

This application claims priority to China Application Serial Number 202010139895.2, filed Mar. 3, 2020, which is herein incorporated by reference in its entirety.

BACKGROUND

Field of Invention

The present invention relates to a shaft structure. More particularly, the present invention relates to a 360 degrees shaft structure with auto-lock function.

Description of Related Art

The notebook computer with 360 degree rotation function may rely on magnet to attract the cover and the base of the notebook computer so as to provide a lock function.

A shaft structure is configured to close or expand the screen and the base of a clamshell electronic device such a notebook computer, a mobile phone, or an e-book reader. A typical shaft structure is a uniaxial structure, which commonly includes a frame fixed on the screen of the electronic product. The frame may have a shaft hole such that a mandrel may penetrate. The screen may be opened or folded relative to the base through rotation of the frame relative to the mandrel.

In addition, since the portable computer may have the requirements for touching or writing functions, the screen and the base need to be rotated more than 180 degrees or even to 360 degrees reversely such that the portable computer can be hold conveniently. Therefore, a biaxial design is developed.

However, during the process of closing the electronic product such that the screen and the bare are close to each other, a magnet is utilized to attract the cover and the base so as to provide a lock function. Therefore, how to provide a shaft structure which can provide auto-lock function such that the screen and the base may be closed and locked automatically and the cost and space for disposing the magnet can be saved is still an issue for study and development.

SUMMARY

The invention provides a shaft structure of an electronic device with auto-lock function.

According to one embodiment of the present invention, a shaft structure includes a carrier, a first mandrel, and a second mandrel. The carrier has a groove, a receiving space communicated with the groove, and two protruding portions. The two protruding portions protrude from an inner wall of the carrier, and the two protruding portions are located between the receiving space and the groove. The first mandrel has a first gear, a first rotation shaft, and a first connection shaft connected to the first gear and the first rotation shaft. The first gear is located in the receiving space. The second mandrel has a second gear, a second rotation shaft, and a second connection shaft connected to the second gear and the second rotation shaft. The second gear is configured to move in the receiving space and the groove.

According to one embodiment of the present invention, the first connection shaft and the second connection shaft are configured to expand and contract along a first axis, and the first axis is perpendicular to a rotation direction of the first rotation shaft.

According to one embodiment of the present invention, the first rotation shaft is connected to a cover, the second rotation shaft is connected to a base, and the first connection shaft and the second connection shaft expand as an angle between the cover and the base reduces.

According to one embodiment of the present invention, the first rotation shaft is connected to a cover, the second rotation shaft is connected to a base, and the first connection shaft and the second connection shaft contract as an angle between the cover and the base increases.

According to one embodiment of the present invention, the first gear and the second gear are helical gears.

According to one embodiment of the present invention, the shaft structure further includes a third gear meshing with the first gear and the second gear.

According to one embodiment of the present invention, a rotation direction of the third gear and a rotation direction of the first gear are alternately arranged, and the rotation direction of the third gear and a rotation direction of the second gear are alternately arranged.

According to one embodiment of the present invention, the shaft structure further includes a retaining element disposed on the carrier, and the retaining element is connected to the third gear and a side wall of the carrier.

According to one embodiment of the present invention, the shaft structure further includes a connection element having a first through hole and a second through hole, wherein the first rotation shaft penetrate the first through hole, and the second rotation shaft penetrate the second through hole.

According to one embodiment of the present invention, the shaft structure further includes a housing wrapping the carrier, the first mandrel, and the second mandrel.

According to the aforementioned embodiments, the second gear can move between the groove and the receiving space through the first connection shaft and the second shaft. When the electronic device is in a closed state, the second gear is located in the groove. As such, when the electronic device is expanded again, the resistant force that is needed for the second gear to pass the protruding portions provides the auto-lock function for the electronic device.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
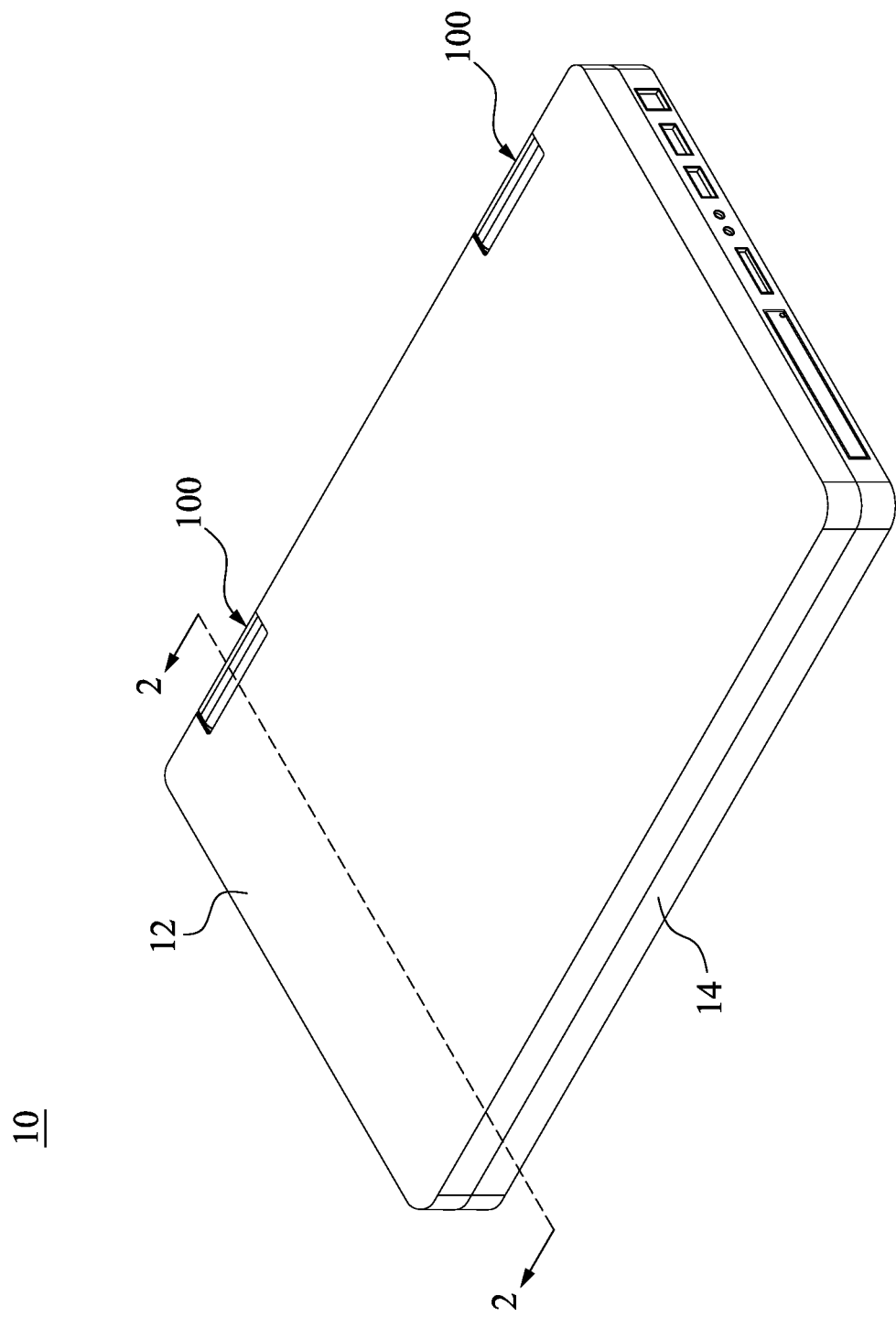
FIG. 1 is a perspective view of an electronic device in a closed state according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Reference will now be made in detail to the present embodiments of the invention, examples of which are illustrated in the accompanying drawings. Wherever possible, the same reference numbers are used in the drawings and the description to refer to the same or like parts.

In addition, terms used in the specification and the claims generally have the usual meaning as each terms are used in the field, in the context of the disclosure and in the context of the particular content unless particularly specified. Some terms used to describe the disclosure are to be discussed below or elsewhere in the specification to provide additional guidance related to the description of the disclosure to specialists in the art.

Phrases "first," "second," etc., are solely used to separate the descriptions of elements or operations with same technical terms, not intended to be the meaning of order or to limit the invention.

Secondly, phrases "comprising," "includes," "provided," and the like, used in the context are all open-ended terms, i.e. including but not limited to.

Further, in the context, "a" and "the" can be generally referred to one or more unless the context particularly requires. It will be further understood that phrases "comprising," "includes," "provided," and the like, used in the context indicate the characterization, region, integer, step, operation, element and/or component it stated, but not exclude descriptions it stated or additional one or more other characterizations, regions, integers, steps, operations, elements, components and/or groups thereof.

Figure 2:
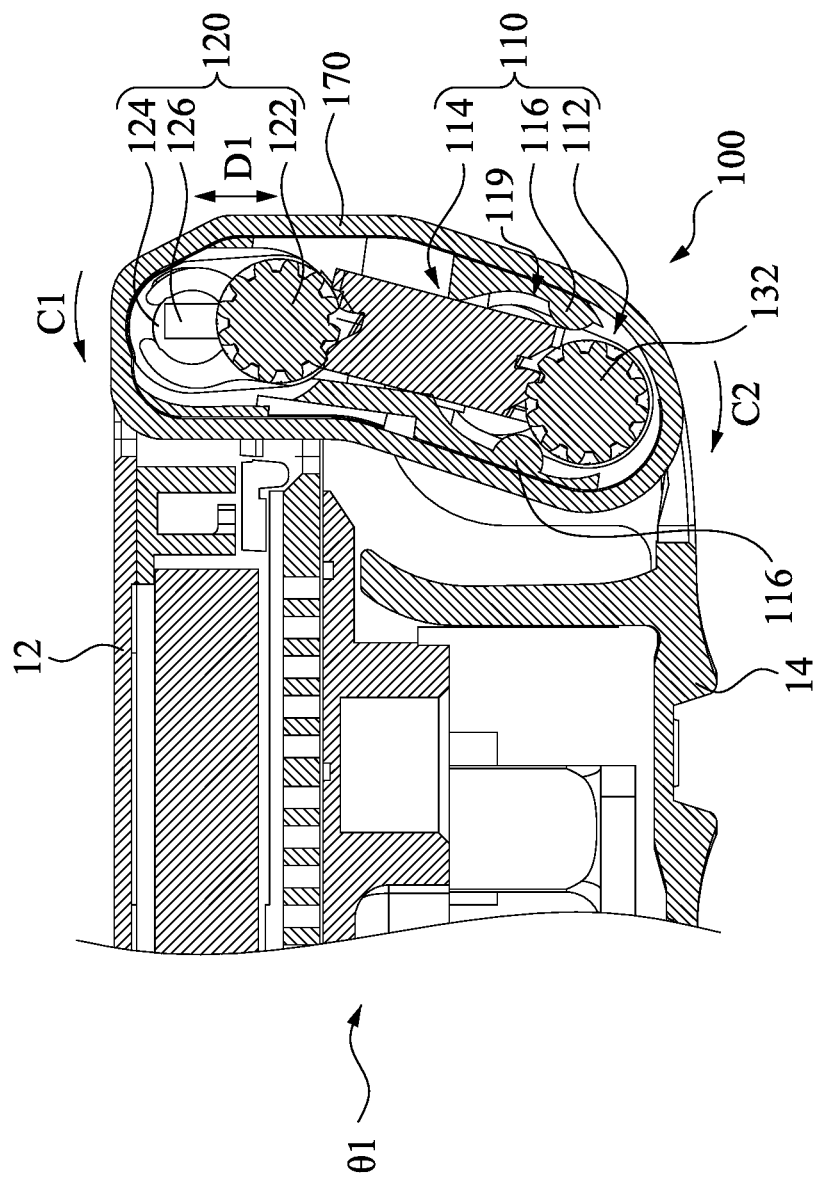
FIG. 2 is a cross-sectional view taken along line 2-2 in FIG. 1.

Reference is made to FIG. 1 and FIG. 2. FIG. 1 is a perspective view of an electronic device 10 in a closed state according to one embodiment of the present invention. FIG. 2 is a cross-sectional view taken along line 2-2 in FIG. 1. The electronic device 10 includes a cover, a base, and a shaft structure 100. The cover 12 and the base 14 are jointed with each other through the shaft structure 100.

Figure 3:
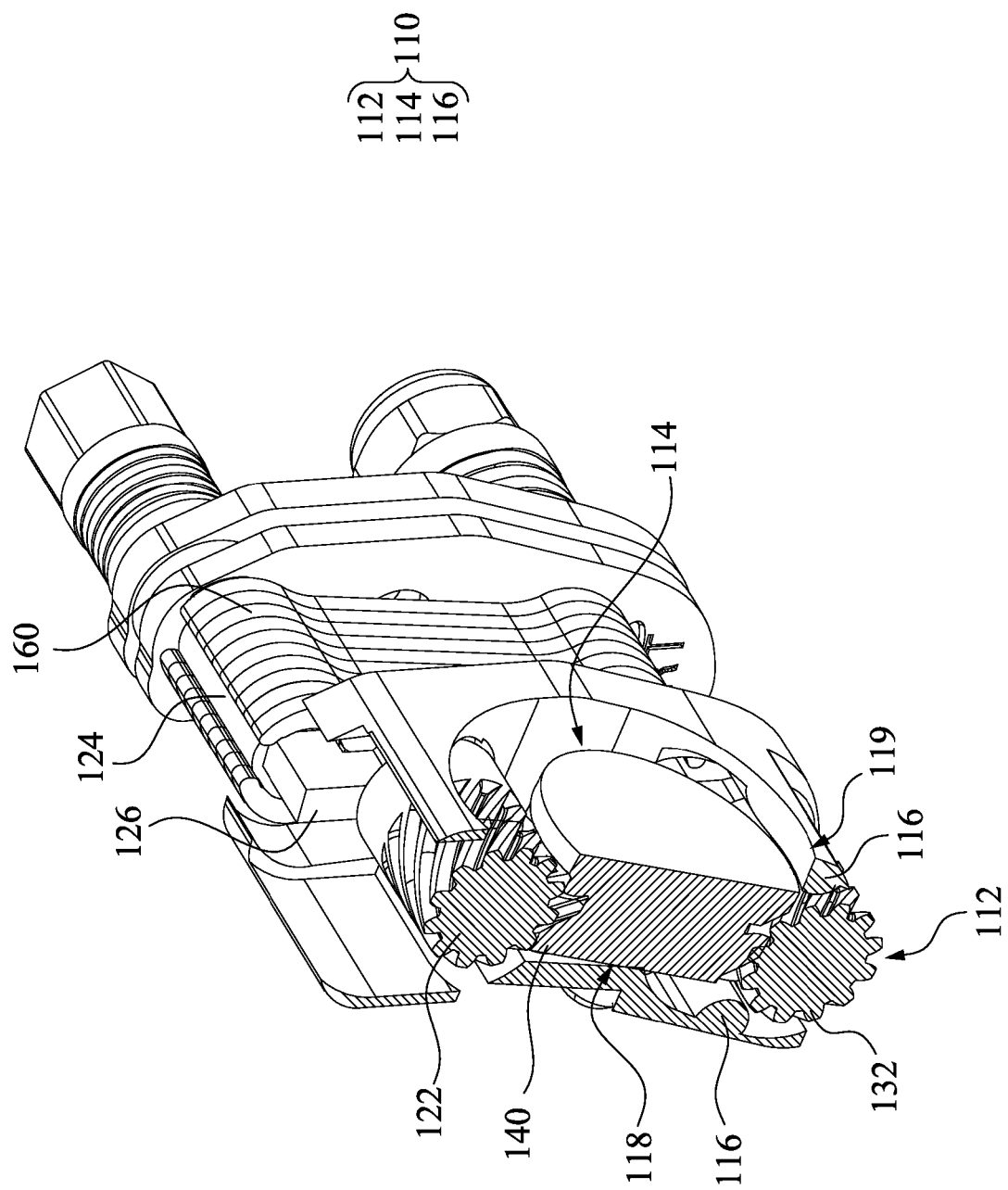
FIG. 3 is a perspective cross-sectional view of a shaft structure according to one embodiment of the present invention.

Reference is made to FIG. 2 and FIG. 3. FIG. 3 is a perspective cross-sectional view of a shaft structure 100 according to one embodiment of the present invention. The shaft structure 100 includes a carrier 110, a first mandrel 120, and a second mandrel 130 (see FIG. 4). The carrier 110 has a groove 112, a receiving space 114 communicated with the groove 112, and two protruding portions 116. The two protruding portions 116 protrude from an inner wall 119 of the carrier 110, and the two protruding portions 116 are located between the receiving space 114 and the groove 112. That is, the receiving space 114 is above the groove 112, and the groove 112 is below the receiving space 114. In the present embodiment, the electronic device 10 may be a notebook computer, and the shaft structure 100 of the electronic device 10 may rotate 360 degrees.

Figure 4:
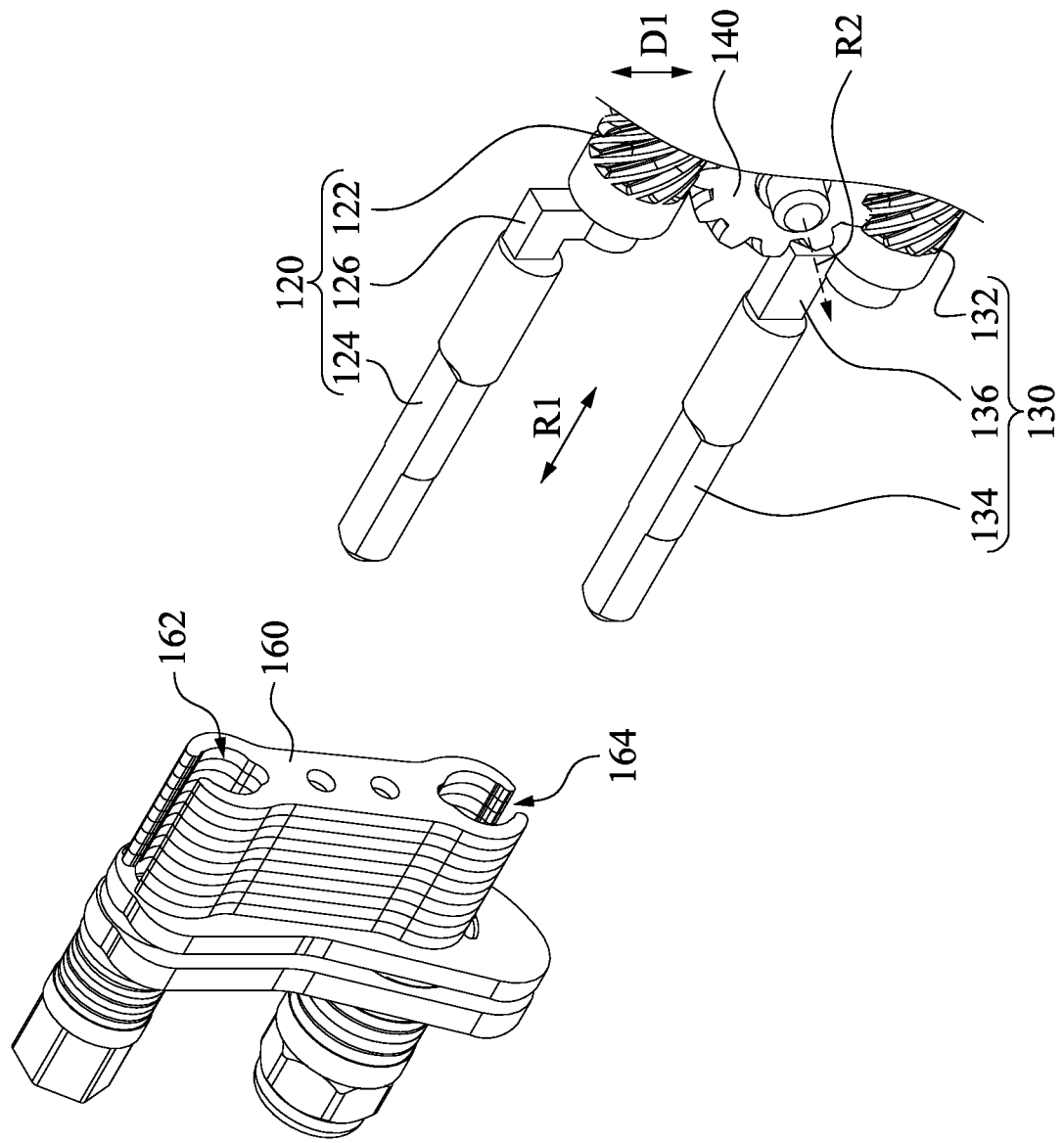
FIG. 4 is a partially exploded view of the shaft structure in FIG. 3, and the carrier is omitted.

Reference is made to FIGS. 2-4. FIG. 4 is a partially exploded view of the shaft structure 100 in FIG. 3, and the carrier 110 is omitted. The first mandrel 120 has a first gear 122, a first rotation shaft 124, and a first connection shaft 126 connected to the first gear 122 and the first rotation shaft 124. The first gear 122 is located in the receiving space 114.

The second mandrel 130 has a second gear 132, a second rotation shaft 134, and a second connection shaft 136 connected to the second gear 132 and the second rotation shaft 134.

The first connection shaft 126 of the first mandrel 120 and the second connection shaft 136 of the second mandrel 130 are configured to expand and contract along a first axis D1. The first axis D1 is perpendicular to rotation directions of the first rotation shaft 124 and the second rotation shaft 134. The first gear 122 is configured to move is the receiving space 114 by expanding and contracting along the first axis D1. The second gear 132 is configured to move in the receiving space 114 and the groove 112 by expanding and contracting along the first axis D1.

Reference is made to FIG. 1 and FIG. 4, the first mandrel 120 is connected to the cover 12, and the second mandrel 130 is connected to the base 14. In some embodiments, the first mandrel 120 may be connected to the cover 12 through connection members and locking elements. The second mandrel 130 may be connected to the base 14 through connection members and locking elements, and a skilled person may adjust connection method according to requirements. For example, the cover 12 may be a housing of a screen housing of a notebook computer, and the base 14 may be a keyboard base of a notebook computer. In other words, when a user closes the notebook computer, the first mandrel 120 and the second mandrel 130 may rotate in opposite directions. When the electronic device 10 is in the closed state, the second gear 132 is retained in the groove 12. Specifically, the second gear 132 may fall into the groove 112 by expanding the second connection shaft 136 when the cover 12 and the base 14 of the electronic device 10 are still separate from each other and the electronic device 10 is almost in the closed state (for example, an angle between 0 degree to 10 degrees is present between the cover 12 and the base 14 or an angle between 350 degrees to 360 degrees is present after folding reversely.) As such, when the electronic device 10 is expanded again, the resistant force that is required for the second gear 132 to pass through the protruding portions 116 may provide the auto-lock function for the electronic device 10. The detailed process of auto-lock function will be described in the following paragraphs.

Figure 5:
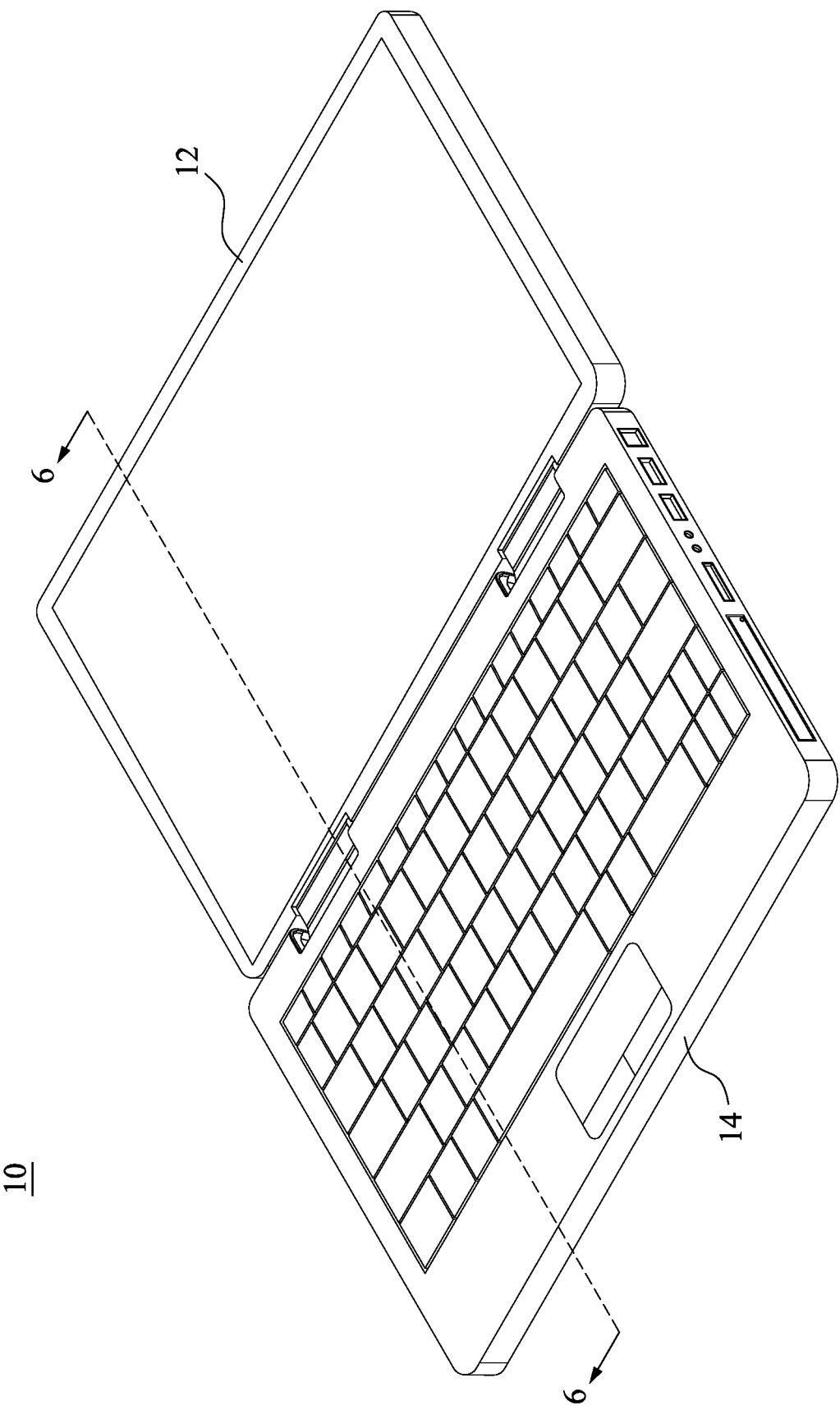
FIG. 5 is a perspective view of an electronic device in an expanded state according to one embodiment of the present invention.
Figure 6:
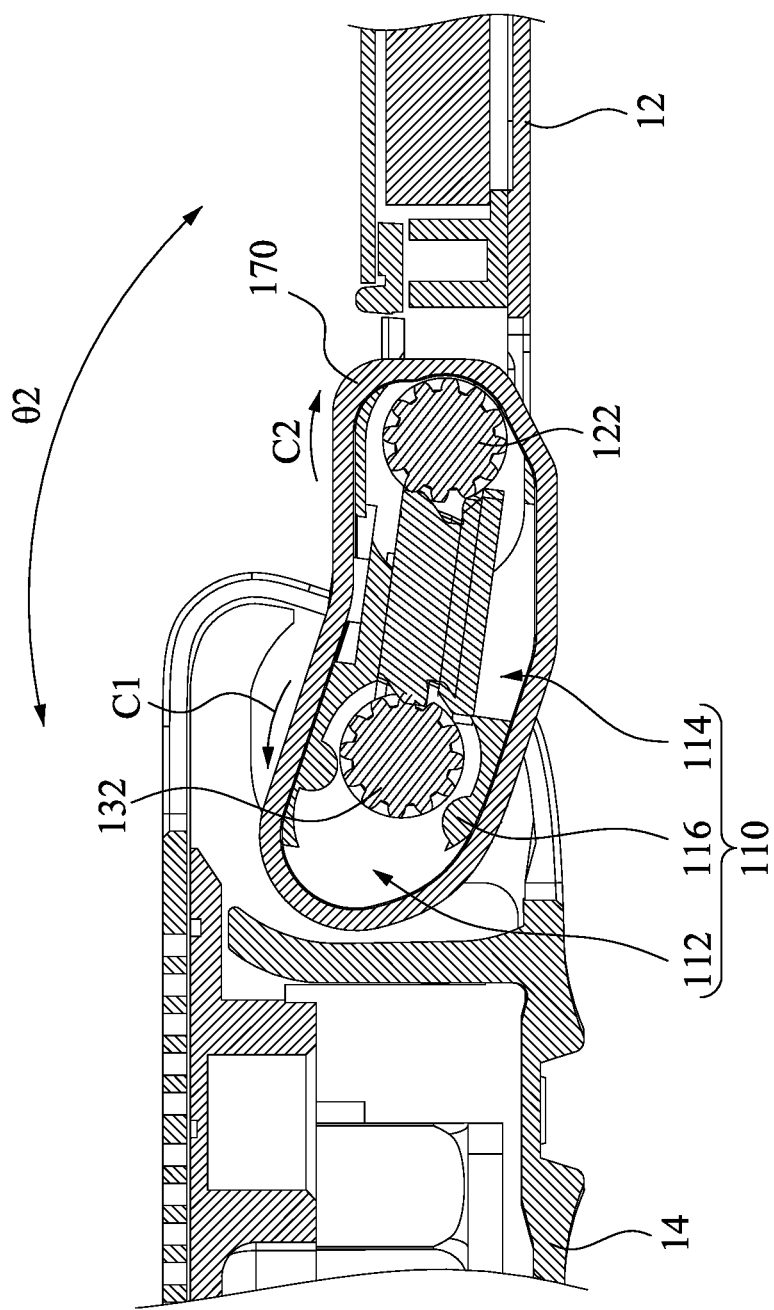
FIG. 6 is a cross-sectional view taken along line 6-6 in FIG. 5.

FIG. 5 is a perspective view of an electronic device 10 in an expanded state according to one embodiment of the present invention. FIG. 6 is a cross-sectional view taken along line 6-6 in FIG. 5. Reference is made to FIG. 5 and FIG. 6. In the present embodiment, when the cover 12 and the base 14 of the electronic device 10 expand about 180 degrees, the second gear 132 is located in the receiving space 114 and is moved away from the groove 112. Specifically, when the angle between the cover 12 and the base 14 of the electronic device 10 is greater than 10 degrees and is smaller than 350 degrees, the second gear 132 can move away from the groove 112 by contracting the second connection shaft 136.

Reference is made to FIG. 3 and FIG. 4. The first gear 122 and the second gear 132 are helical gears. The shaft structure 100 further includes a third gear 140 meshing with the first gear 122 and the second gear 132. The third gear 140 has a rotation direction R2, and the first gear 122 and the second gear 132 have a rotation direction R1. The rotation direction R2 of the third gear 140 and a rotation direction R1 of the first gear 122 are alternately arranged, and the rotation direction R1 of the third gear 140 and a rotation direction of the second gear 132 are alternately arranged.

The shaft structure 100 further includes a retaining element disposed on the carrier 110. The retaining element is connected to the third gear 140 and a side wall of the carrier 110. As such, the first gear 122, the second gear 132, and the third gear 140 may be fixed relative to the carrier 110 along the rotation direction R2.

The shaft structure 100 further includes a connection element 160 having a first through hole 162 and a second through hole 164. The first rotation shaft 124 penetrate the first through hole 162, and the second rotation shaft 134 penetrate the second through hole 164. As such, a distance between the first rotation shaft 124 and the second rotation shaft 134 can be relatively fixed along the first axis D1 through the connection element 160.

Reference is made to FIG. 1 and FIG. 2, the shaft structure 100 further includes a housing 170 wrapping the carrier 110, the first mandrel 120, and the second mandrel 130.

Reference is made to FIG. 2 and FIG. 6, during the process of expanding the electronic device 10 from the closed state as shown in FIG. 2 (an angle θ1 such as 0 degree is present between the cover 12 and the base 14) to the expanded state as shown in FIG. 6 (an angle θ2 such as 180 degree is present between the cover 12 and the base 14), the first gear 122 may rotate along a clockwise direction C1 and the second gear 132 may rotate along a counter-clockwise direction C2 (see FIG. 6) through the meshing between the third gear 140 and the first gear 122 and the meshing between the third gear 140 and the second gear 132. As such, the cover 12 and the base 14 may be away from each other. In addition, a user may apply force so as to contract the first connection shaft 126 and the second connection shaft 136 to take the second gear 132 away from the groove 112. In other words, the first connection shaft 126 and the second connection shaft 136 expand as an angle between the cover 12 and the base 14 reduces.

During the process of folding the electronic device 10 from the expanded state as shown in FIG. 6 (an angle θ2 such as 180 degree is present between the cover 12 and the base 14) to the closed state as shown in FIG. 2 (an angle θ1 such as 0 degree is present between the cover 12 and the base 14), the first gear 122 may rotate along the counter-clockwise direction C2 and the second gear 132 may rotate along the clockwise direction C1 (see FIG. 2) through the meshing between the third gear 140 and the first gear 122 and the meshing between the third gear 140 and the second gear 132. As such, the cover 12 and the base 14 may move toward each other. In addition, when the cover 12 is located above the base 14, and there is an angle smaller than about 10 degree between the cover 12 and the base 14, the first gear 122, the second gear 132, and the third gear 140 may slide downwardly through expanding of the first connection shaft 126 and the second connection shaft 136. As such, the second gear 132 may move into to the groove 112. Therefore, when the electronic device is expanded again, the resistant force that is required for the second gear 132 to pass through the protruding portions 116 may provide the auto-lock function.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A hinge, comprising:
 a housing, having a hollow interior defined by an inner wall, the hollow interior is elongated along a first axis, the inner wall including a carrier dividing the hollow interior into a groove and receiving space communicated with the groove, the carrier including two protruding portions;
 a first mandrel having a first gear, a first rotation shaft, and a first connection shaft connected to the first gear and the first rotation shaft, wherein the first gear is located in the receiving space;
 a second mandrel having a second gear, a second rotation shaft, and a second connection shaft connected to the second gear and the second rotation shaft; and
 wherein the hollow interior wraps the first gear and the second gear, and
 wherein the second gear is configured to move between the groove and the receiving space.

2. The hinge of claim 1, wherein the first rotation shaft is connected to a cover, the second rotation shaft is connected to a base, and the hinge has a first position having the first gear located in the receiving space, and the second gear is located in the groove.

3. The hinge of claim 1, wherein the first rotation shaft is connected to a cover, the second rotation shaft is connected to a base, and the hinge has a second position having the first gear and the second gear located in the receiving space.

4. The hinge of claim 1, wherein the first gear and the second gear are helical gears.

5. The hinge of claim 1, further comprising:
 a third gear meshing with the first gear and the second gear.

6. The hinge of claim 5, wherein the first and second mandrels are parallel, and the third gear rotates perpendicularly to the first and second mandrels.

7. The hinge of claim 1, further comprising:
 a connection element having a first through hole and a second through hole, wherein the first rotation shaft penetrate the first through hole, and the second rotation shaft penetrate the second through hole.

* * * * *